Feb. 23, 1960  R. F. MARQUIS, JR  2,926,027
TWO-PART UNION HAVING LEFT AND RIGHT HAND THREADS
Filed Sept. 13, 1957
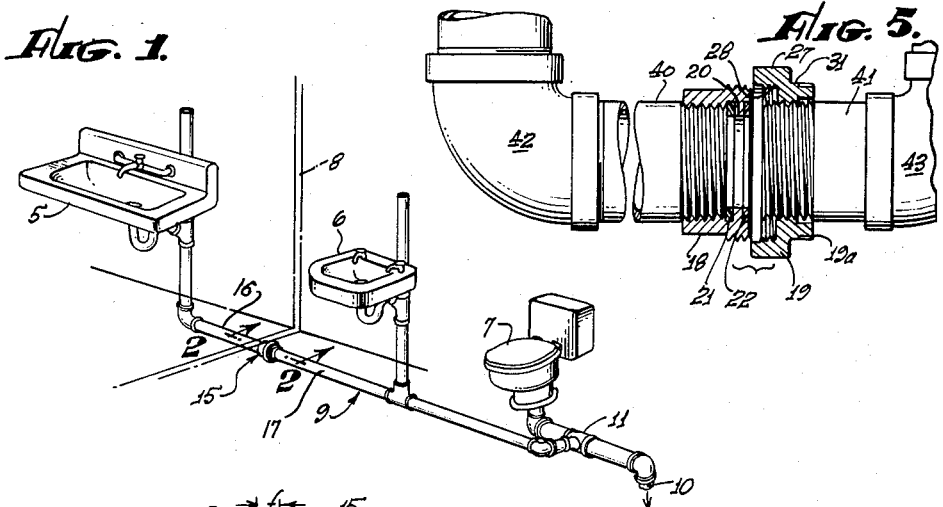
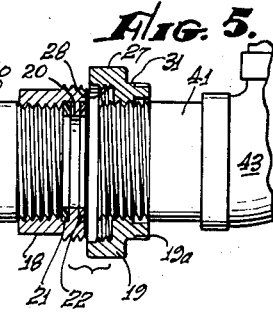
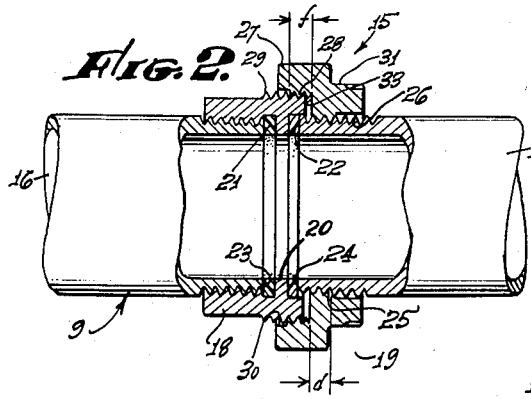
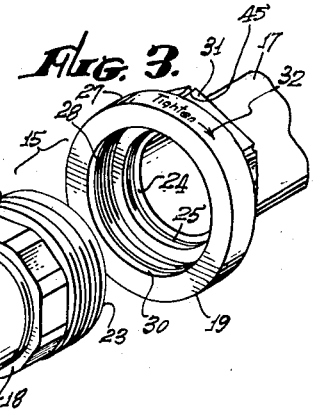
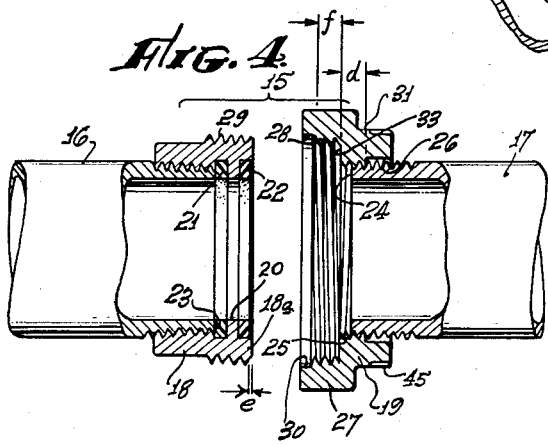
RILEY F. MARQUIS, JR.
INVENTOR.
BY Flam and Flam
ATTORNEYS.

United States Patent Office 2,926,027
Patented Feb. 23, 1960

2,926,027

TWO-PART UNION HAVING LEFT AND RIGHT HAND THREADS

Riley F. Marquis, Jr., Los Angeles, Calif.

Application September 13, 1957, Serial No. 683,753

3 Claims. (Cl. 285—32)

This invention relates to plumbing, and particularly to a new union.

Plumbing unions in the past normally comprised three parts, namely, members carried at the ends of the pipes to be joined and providing mutual conical engagement, and a clamp nut mounted on one of the members and engageable with the other of the members for drawing the members together and into sealing relationship. Unions such as these have several disadvantages. Sealing is required between each of the members and the threads of the corresponding pipe.

The primary object of this invention is to provide a new union that comprises only two simple parts rather than three parts.

Another object of this invention is to provide a two-part union in which sealing between the union members and the threads of the pipe is unnecessary.

Another object of this invention is to provide a two-part union which requires no alteration of the standard pipes to be joined.

Another object of this invention is to provide a simple union of this character that offers no resistance to flow, whereby the union can be effectively used in a drainage line.

Still another object of this invention is to provide a simple two-element union which can be manufactured at a cost far less than that of a three-part union.

Still another object of this invention is to provide a simple two-part union of this character that requires relatively little axial space, whereby the union can be effectively used. For example, by making only one cut in an existing line and by threading the ends, the pipes are adapted for cooperation with the two-part union. It is unnecessary to make two cuts to allow for the insertion of the union.

Still another object of this invention is to provide a union of this character that is easily installed or removed and that requires only a small wrench for coupling and uncoupling.

Yet another object of this invention is to provide a union cooperable with a wrench even if the union is placed directly against a wall.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a diagrammatic view of a typical plumbing installation, utilizing a union incorporating the present invention;

Fig. 2 is an enlarged axial sectional view, taken along the plane indicated by line 2—2 of Fig. 1, and illustrating the union in operative position;

Fig. 3 is a pictorial view of the union with the respective members, of the union unconnected but on the pipe ends;

Fig. 4 is an axial sectional view similar to Fig. 2, but illustrating the parts prior to coupling; and Fig. 5 illustrates another novel application of the union.

In Fig. 1, there are illustrated a sink 5, a lavatory 6 and a water closet 7. The sink 5 may, for example, be incorporated in one prefabricated wall of a home or trailer; and the lavatory 6 and the water closet 7 may be incorporated in another wall. The joint between the walls is indicated at 8.

A small drain line 9 cooperates with the sink 5 and the lavatory 6. A larger drain 10 cooperates with water closet 7. A T-fitting 11 connects the drain line 9 to the drain 10. The line 9 includes parts or nipples 16 and 17 carried by the respective wall sections. A union 16 facilitates their connection.

The union 15 comprises two members 18 and 19. One of the members 18 provides a seal between the nipples 16 and 17. For this purpose, inner and outer sealing rings 21 and 22, of rectangular cross-section, are placed on opposite sides of an internal flange 20 formed on the member 18. The flange 20 is spaced inwardly from the outer or right-hand end of the member 18 to form a retaining recess for the outer ring 22. The rings 21 and 22 are of neoprene or the like. The inner or left-hand end of the member 18 is internally threaded for receiving the standard tapered threads of the nipple 16. The end 23 of the nipple 16 engages the sealing ring 21 and urges it tightly against the flange 20. A seal between the flange 20 and the nipple 16 is thus established independently of the threads of the nipple 16 and the member 18.

The end 24 of the nipple 17 is intended to engage the other or outer sealing ring 22 in a similar manner.

In order that the union 15 be compact and insertable in a small break in a pipe, for example, the distance between the end 23 of the nipple 16 and the extreme right-hand surface 18a of the member 18 is desirably minimized. Hence the flange 20 is judiciously located to achieve this result. Thus the flange 20 is located as close as possible to the surface 18a without causing the sealing ring 22 to protrude therebeyond. Hence the dimension e between the ring 22 and the end surface 18a is virtually zero.

Formed peripherally on the member 18 are threads 29 that serve as a means whereby the union member 19 can pull the nipple 17 toward the ring 22, and in a manner to be presently described. The location of these threads 29 relative to the end surface 18a of the member 18 is also important for purposes of achieving a compact union, as will appear hereinafter. Thus the threads 29 extend all the way to the end surface 18a.

The member 19 has, intermediate its length, internal threads 25 of only a few turns, receiving the standard tapered threads at the end of the nipple 17. A chamfered surface 26, at the inner or right-hand end of the member 19 and adjoining the threads 25, facilitates the establishment of a threaded relationship.

When a threaded engagement is established between the member 19 and the nipple 17, the members 18 and 19 are ready for coupling. The extent that the member 19 is threaded upon the nipple 17 is uncritical. Fig. 4 illustrates one position in which the member 18 is at the end of the nipple 17.

The member 19 has at its outer left-hand end an enlarged flange 27 in which the outer or right-hand end of the member 18 is received. The flange 27 provides internal threads 28 cooperable with the threads 29. A chamfer or enlargement 30 facilitates establishment of threaded relationship.

A shoulder 33 defines the necessary step between the threads 25 and 28 of the member 19. The threads 28 extend all the way to the shoulder 33. This makes maximum use of the axial dimension of the member 19 to the left of the shoulder 33 for purposes of compactness.

As the threads of the union members 18 and 19 engage, the intermediate threads 25 of the member 19 move inwardly from the end of the nipple 17 to expose the nipple end within the flange 27 and cause the nipple 17 to move toward the sealing ring 22. In order to ensure this result, the threads 28 and 29 are of a pitch opposite that of the threads 25. Since the threads of the nipple 17 are conventionally right-hand threads, the threads 28 and 29 are, in practice, left-hand threads.

The threads 25 pull the nipple 17 forwardly as the member 19 is rotated. Furthermore, the nipple 17 is carried forwardly with the union member 19 as it moves into threaded relationship with the union member 18. The effect is thus cumulative, and in a few turns the end 24 of the nipple 17 seals against the sealing ring 22, as illustrated clearly in Fig. 2.

The member 19 has a reduced non-circular portion 31 adjoining the flange 27 to facilitate rotation of the member 19 by a wrench. The member 18 has a similar non-circular portion. Since a seal is established by the yielding rings 21 and 22, only a slight tightening is required to ensure sealing relationship. Hence, a small wrench can be used.

The threads 25 must not tighten on the tapered threads of the nipple 17 before the end 24 engages the ring 22. Otherwise, the member 19 would be prevented from further rotation and the intended seal would not be accomplished. To ensure against this, the threads 25 have but a few turns, and are of a size such that they will not tighten even upon a material axial movement along the nipple threads.

Similarly, the threads 28 and 29 must not tighten prematurely. Accordingly, they are untapered, and have sufficient clearance to prevent tightening throughout the entire range of mutual threaded relationship. The limit to telescopic movement of the members 18 and 19 is thus determined by the engagement of the end 24 of the nipple 17 with the ring 22.

Because the threads 25 and 28, 29 do not tighten, the position of the nipple relative to the threads 25, upon initial engagement of the threads 28 and 29, is relatively uncritical. It is only necessary that the threads 28 and 29 be long enough to ensure their cooperation throughout a sufficient range. Yet this length is small.

By observing certain criteria of design, the length $f$ (Fig. 2) of necessary relative threaded travel between members 18 and 19 at threads 28 and 29 is minimized, and an axially compact union is achieved. The dimension $f$ extends from the end surface $18a$ of the member 18 at starting position, and to the shoulder 33 which engages this surface to form a stop. Since the threads 29 extend to the end surface, and since the threads 28 extend to the shoulder 33, the dimension $f$ is, in practice, the length of the threads 28. It will now be appreciated that the dimension $f$ is minimized by carrying the thread 29 to the end surface $18a$ and by carrying the threads 28 all the way to the shoulder 33.

The criteria necessary for further minimizing the dimension $f$ for purposes of compactness are related to the maximum movement of the nipple 17. Thus when the right-hand or starting end of the threads 29 is placed initially in engagement with the left-hand or starting end of the threads 28, the maximum distance between the end of the nipple 17 and the sealing ring 22, and which distance must be reduced to zero for engagement, obviously depends upon two physical factors of relative spacing.

The first factor is the axial spacing of the sealing ring 22 relative to the start of the threads 29 along the part 18. The second factor is the axial spacing between the start of the threads 28 and the right-hand or starting end of the threads 25. Obviously, the initial spacing is reduced as the nipple 17 is initially threaded a greater distance into the member 19, but there is no assurance that the user will do this, and there is no reason, apart from the specific one to be discussed hereinafter, to compel him to do so.

The first factor is represented by the dimension $e$, the threads 29 extending to the end surface $18a$. As noted above this dimension is desirably virtually zero; hence, it adds nothing to the initial spacing.

The second factor is the sum of $f$ and $d$ (Fig. 4). The dimension $d$ takes up where the dimension $f$ leaves off, namely, at the shoulder 33. Thus the dimension $d$ extends from the shoulder 33 to the starting or right-hand end of the threads 25. The dimension $f$ must be large enough to ensure that the shoulder 33 doesn't stop the member 18 prematurely, that is before the dimension $d$ plus $f$ is spanned by movement of the end surface 24.

Assuming that there are $n$ turns of relative threaded engagement permitted by the members 18 and 19 by virtue of the length $f$ and the thread pitch $p_1$ at the threads 28—29, then $n$ turns must be sufficient to cause the required movement of the nipple end 24. In $n$ turns, the end 24 will advance a distance corresponding to $n \times p_2$ plus $n \times p_1$ where $p_2$ is the pitch of the threads 25. Thus movement results cumulatively from both threads. This result is achieved by virtue of the fact that the threads are of opposite pitches.

Now the total movement resulting by relative turning movement of the members 18 and 19 is represented by $n \times p_1$ plus $n \times p_2$. This quantity must be greater than the dimension $d$ plus $f$ to ensure against premature binding. But $n \times p_1$ by definition is $f$. Hence, the relationship is: $n \times p_2 + f$ must be greater than $d + f$; in other words $n \times p_2$ must be greater than $d$.

Now $n$ by definition is equal to $f$ divided by $p_1$. Hence, by substitution, the criterion resolves itself to this:

$$f\frac{p_2}{p_1} \text{ must exceed } d$$

By keeping the pitch of the threads 28, and 29 relatively small, and by minimizing the turns at 25, a compact arrangement is provided. Thus it is seen that minimizing the turns at 25 serves this purpose as well as for ensuring against tightening on the tapered pipe threads. Only two or three turns are actually provided in the example illustrated.

In Fig. 5, a different relative starting position of the member 19 is illustrated. In this case, nipples 40 and 41 were formed by cutting through a short length of pipe, such as for repair purposes. The ends of the nipples 40 and 41 were made accessible for threading by rotating one of the elbows 42 or 43. The members 18 and 19 were placed at the starting position shown before the nipples were rotated to the aligned relationship illustrated. In this starting position, the end of the nipple 41 extends almost to the start of the threads 28 of the flange 27. Obviously the end of the nipple 40 will engage the sealing ring 22 upon a very slight relative turning movement between the members 18 and 19. By using this starting relationship, only one cut need be provided in the pipe. By slight flexure between the elbows 42 and 43, the union members can be aligned, the compact union making this function possible.

An aligned relationship between the rear surface $19a$ of the member 19 and the base of the threads on the nipple 41 provides a guide for determining the proper relative position of the member 19 and the nipple 41 for starting. Thus, the distance between the start of the threads 28 to the end surface $19a$ is slightly greater than the standard length of the threads on the nipple 17.

The fact that the threads 25 have but a few turns does not detract in any measure from the efficiency of the seal since the threads 25 are not exposed to the interior of the nipples 16 and 17. A seal is accomplished solely by means of the union element 18. Thus, the seal is effective as follows: between the nipple end 23, sealing ring 21, flange 20, sealing ring 22 and the end 24 of the nipple 17.

The internal diameter of the flange 20 and the sealing rings 21 and 22 corresponds as nearly as possible to the internal diameter of the standard nipples 16 and 17. Accordingly, there is no obstruction to flow occasioned by the union.

To facilitate installation and to avoid confusion because the threads 28 and 29 are left-hand threads, a legend 32 is provided on the flange 27, advising the user the direction of turning required for tightening or loosening.

The non-circular portion of the member 18 is spaced axially from the coupling threads 28 at the flange 27. The non-circular portion need not be of a size greater than the threads 28 because it does not extend in encompassing relationship thereto. The non-circular portion is purposely made of a size the maximum diameter of which is less than the outer diameter of the flange 27. This facilitates actual placement of the union against a wall. In this case, the circular flange 27 may contact the wall to act as a spacer for the non-circular portion, whereby the non-circular portion can cooperate with a spaner wrench or the like. Slots or recesses 45 are provided for this purpose.

In this instance, the slots 45 are located at the corners of the non-circular portion 31.

The inventor claims:

1. A two-part union for joining pipe sections, each having standard tapered pipe threads: a pair of hollow open-ended members; the first member having an internal flange against opposite sides of which sealing rings are adapted to be placed; there being internal threads at one end of the said first member and cooperable with the threads of one of said pipe sections; said first member having peripherally formed untapered left-hand threads extending substantially to the other end of said first member; a pair of sealing rings placed against opposite sides of the said internal flange, the first ring being interposed between the flange and said one pipe section, and the second ring facing the said other end of said one member; said flange being so located that said second ring, when placed against said flange, is located substantially flush with said other end of said first member; the second member having an intermediate shoulder; said second member having internal and untapered left-hand threads extending from the outer portion of the shoulder outwardly toward one end of said second member for threaded cooperation with the left-hand threads of said first member; said left-hand threads of said second member extending inwardly from said one end substantially to the shoulder proper; said second member having internal right-hand threads extending from the inner portion of the shoulder toward the other end of said second member, said internal right-hand threads extending substantially from the shoulder proper and for a number of turns the order of only two or three, said internal right-hand threads being cooperable with the tapered threads of the other of said pipe sections without tightening; the length of the left-hand threads of said second member being substantially equal to, but not less than, the length of the internal right-hand threads of said second member multiplied by the ratio of the pitch of the left-hand threads to that of the said right-hand threads whereby the length of said left-hand threads of said second member is minimized without danger of movement of the members being stopped before the end of said other pipe section engages said second sealing ring; the location of said left-hand threads of the first and second members relative, respectively, to the said other end of said first member and the said shoulder, and the substantially flush location of said second sealing ring serving to minimize the axial dimensions of said members whereby the members may cooperate with pipe sections, the ends of which are closely adjacent.

2. The combination as set forth in claim 1 in which said second member at said one end is peripherally cylindrical, and at its other end is non-cylindrical for cooperation with a wrench or the like, the axial projection of said cylindrical portion lying entirely in exterior encompassing relationship to said non-cylindrical portion whereby the union is automatically spaced from a wall a distance sufficient to ensure that a wrench may cooperate with said second member without danger of injuring said wall.

3. The combination as set forth in claim 1 in which the other end of said second member is spaced from the outer end of the left-hand threads thereof a distance slightly greater than the standard length of the threads of said other pipe section, to form a guide by alignment of said other end with the base of the threads of the pipe section whereby the union members can cooperate with ends of pipe sections formed by a single cut in an existing line, and with only modest flexure of said pipe sections for insertion of said union members and for movement towards each other for sealing relationship.

References Cited in the file of this patent

UNITED STATES PATENTS

| | | |
|---|---|---|
| 176,796 | Martin | May 2, 1876 |
| 861,828 | Grindrod | July 30, 1907 |
| 1,191,886 | Glauber | July 18, 1916 |
| 1,325,826 | Baker | Dec. 23, 1919 |
| 1,570,155 | Karbowski | Jan. 19, 1926 |
| 1,889,869 | Montgomery | Dec. 6, 1932 |
| 2,187,217 | Winslow | Jan. 16, 1940 |
| 2,374,138 | Sanford | Apr. 17, 1940 |
| 2,702,715 | Andrews | Feb. 22, 1955 |

FOREIGN PATENTS

| | | |
|---|---|---|
| 5,302 | Great Britain | Mar. 3, 1904 |
| 380,557 | Great Britain | Sept. 22, 1932 |